United States Patent
Mann

(10) Patent No.: US 7,318,088 B1
(45) Date of Patent: Jan. 8, 2008

(54) RECEIVING DATA AT A CLIENT COMPUTER AND PERFORMING AN OPERATION ON THE DATA AT THE CLIENT COMPUTER BASED ON INFORMATION IN THE KEY FILE

(75) Inventor: David Art Mann, Irvine, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 1001 days.

(21) Appl. No.: 09/823,725

(22) Filed: Mar. 30, 2001

(51) Int. Cl.
*G06F 15/177* (2006.01)
*G06F 9/445* (2006.01)

(52) U.S. Cl. ............... 709/221; 713/2; 717/178; 709/226

(58) Field of Classification Search ........... 709/220, 709/221, 228; 717/175–178; 713/2
See application file for complete search history.

(56) References Cited

U.S. PATENT DOCUMENTS

| | | | |
|---|---|---|---|
| 5,900,905 A * | 5/1999 | Shoff et al. ............ | 725/91 |
| 6,204,840 B1 * | 3/2001 | Petelycky et al. ...... | 715/500.1 |
| 6,289,378 B1 * | 9/2001 | Meyer et al. ........... | 709/223 |
| 6,351,267 B1 * | 2/2002 | Gever et al. ........... | 345/473 |
| 6,449,638 B1 * | 9/2002 | Wecker et al. .......... | 709/217 |
| 6,523,022 B1 * | 2/2003 | Hobbs .................... | 707/3 |
| 6,529,784 B1 * | 3/2003 | Cantos et al. .......... | 709/246 |
| 6,578,201 B1 * | 6/2003 | LaRocca et al. ........ | 725/86 |
| 6,604,144 B1 * | 8/2003 | Anders ................... | 709/231 |
| 6,725,257 B1 * | 4/2004 | Cansler et al. ......... | 709/219 |
| 6,745,368 B1 * | 6/2004 | Boucher et al. ........ | 715/500.1 |
| 6,802,061 B1 * | 10/2004 | Parthasarathy et al. .. | 717/173 |
| 6,816,964 B1 * | 11/2004 | Suzuki et al. .......... | 709/232 |
| 6,971,067 B1 * | 11/2005 | Karson et al. .......... | 715/777 |

OTHER PUBLICATIONS

Vuorimaa, P. et al., "XML based text TV", IEEE Conference on Web Information Systems Engineering, v 1, p 109-113, Jun. 2000.*

* cited by examiner

*Primary Examiner*—Patrice Winder
(74) *Attorney, Agent, or Firm*—Jonathan E. Prejean, Esq.; Howard H. Sheerin, Esq.

(57) ABSTRACT

A method of receiving data at a client computer and performing an operation on the received data is disclosed. The method comprises: receiving a key file having a rule identifying the operation to be performed on the data received at the client computer; receiving the data at the client computer; and performing the operation identified by the rule in the key file on the data received at the client computer.

4 Claims, 5 Drawing Sheets

| | |
|---|---|
| CHANNEL BITMAP | STORE BITMAP DATA IN APPROPRIATE LOCATION SO THAT BITMAP WILL BE DISPLAYED WITH APPROPRITE CHANNEL DATA |
| CONSOLE BITMAP | STORE BITMAP DATA IN APPROPRIATE LOCATION SO THAT BITMAP WILL BE DISPLAYED WITH APPROPRITE CONSOLE COMPONENT |
| SUPPORT FILE | DISPLAY CONTENT IN APPROPRIATE LOCATION |
| EXECUTABLE | RUN EXECUTABLE PROGRAM AND PLACE PROGRAM IN STARTUP FOLDER IF SPECIFIED |
| UPGRADE | REPLACE EXISTING FILE AND RUN SETUP PROGRAM IF NECESSARY |
| DOCUMENT FILE | STORE FILE IN APPROPRIATE LOCATION |

FIG. 4

RECEIVING DATA AT A CLIENT COMPUTER AND PERFORMING AN OPERATION ON THE DATA AT THE CLIENT COMPUTER BASED ON INFORMATION IN THE KEY FILE

BACKGROUND OF THE INVENTION

1. Field of the Invention

The present invention relates generally to receiving data at a client computer, and more particularly to a client computer receiving data and a key file and performing an operation on the data based on information in the key file.

2. Description of the Prior Art

Computer users can receive various types of data. For example, a user may download data, such as a text file or an executable file from a website. The control of the receipt of data at a user's computer typically is in the control of a user.

There are configuration management systems, such as Microsoft® Systems Management Server (SMS), that provide capabilities for an individual, such as a member of an information technology (IT) department to transmit data to one or more client computers. For example, a member of the IT department in a corporation may use SMS to install a new version of a software program on some or all of the client computers in the organization. Such a system typically works on a private network, for example an intranet. If an operation is to be performed on the data at a client computer, for example running an executable file, typically either the instructions for the operation to be performed on the data are known by the data itself or the user must take an affirmative action. For example, for an executable file, either the user takes an affirmative action to run the executable file or the executable file contains instructions that it is a self-executing executable file.

A need exists for a system that allows data to be transmitted to an individual user or a group of users that does not require the user to take any affirmative action. The system should automatically process the data at the client computer as desired by the sender based on instructions sent by the sender along with the data.

SUMMARY OF THE INVENTION

One embodiment of the invention comprises a method of receiving data at a client computer and performing an operation on the received data. The method comprises: receiving a key file having a rule identifying the operation to be performed on the data received at the client computer; receiving the data at the client computer; and performing the operation identified by the rule in the key file on the data received at the client computer.

Another embodiment of the invention comprises a method of transmitting data to at least one client computer. The method comprises: providing data to be transmitted to the at least one client computer; generating a key file comprising a rule identifying an operation to be performed on the data; transmitting the key file to the at least one client computer; and transmitting the data to the at least one client computer.

BRIEF DESCRIPTION OF THE DRAWINGS

FIG. 4 is a table enumerating exemplary types (e.g., formats) of data that can be received by the client computer and a brief description of the operations to be performed on the data at the client computer.

DESCRIPTION OF THE PREFERRED EMBODIMENTS

Figure 1:
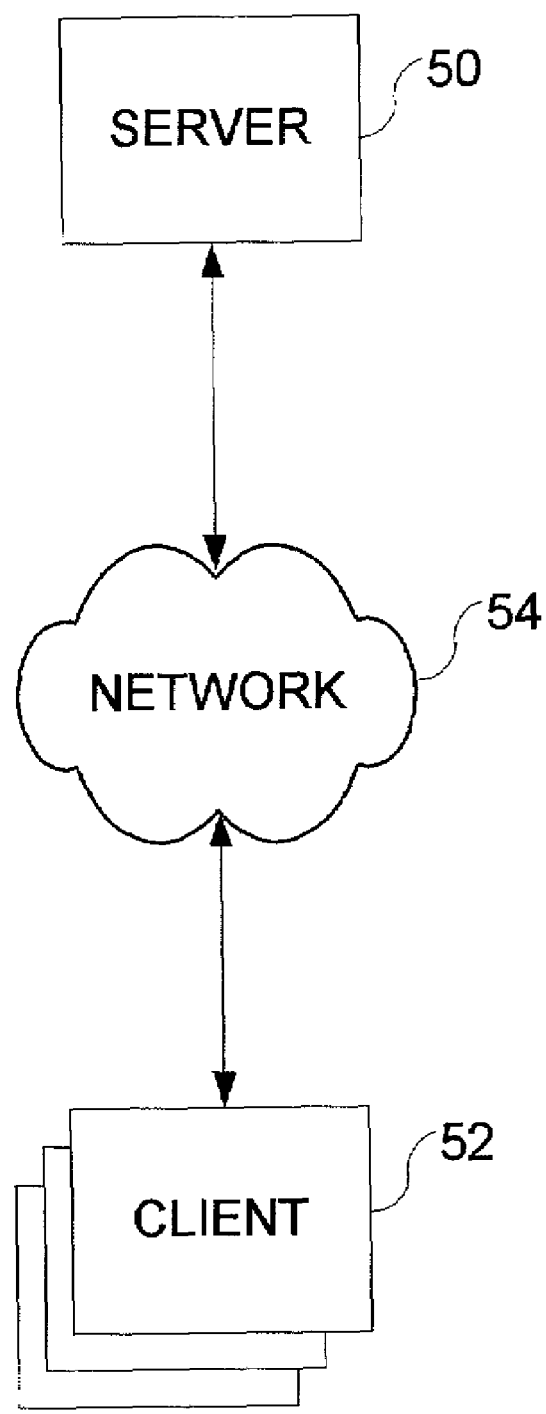
FIG. 1 is a block diagram illustrating the major components of a system for receiving data and a key file at a client computer and performing an operation on the data based on information in the key file.

Referring now to the drawings wherein the showings are for purposes of illustrating preferred embodiments of the present invention only, and not for purposes of limiting the same, FIG. 1 is a block diagram illustrating the major components of a system for a client computer 52 to receive data and perform an operation on the received data in accordance with the present invention. Client computers 52 receive data. For example, client computers 52 may receive data from a server 50 over a network 54, such as the Internet. In exemplary embodiments, client computers 52 can receive data from multiple sources, e.g., multiple servers 50. Alternatively, the data may come from a single server 50.

Figure 2:
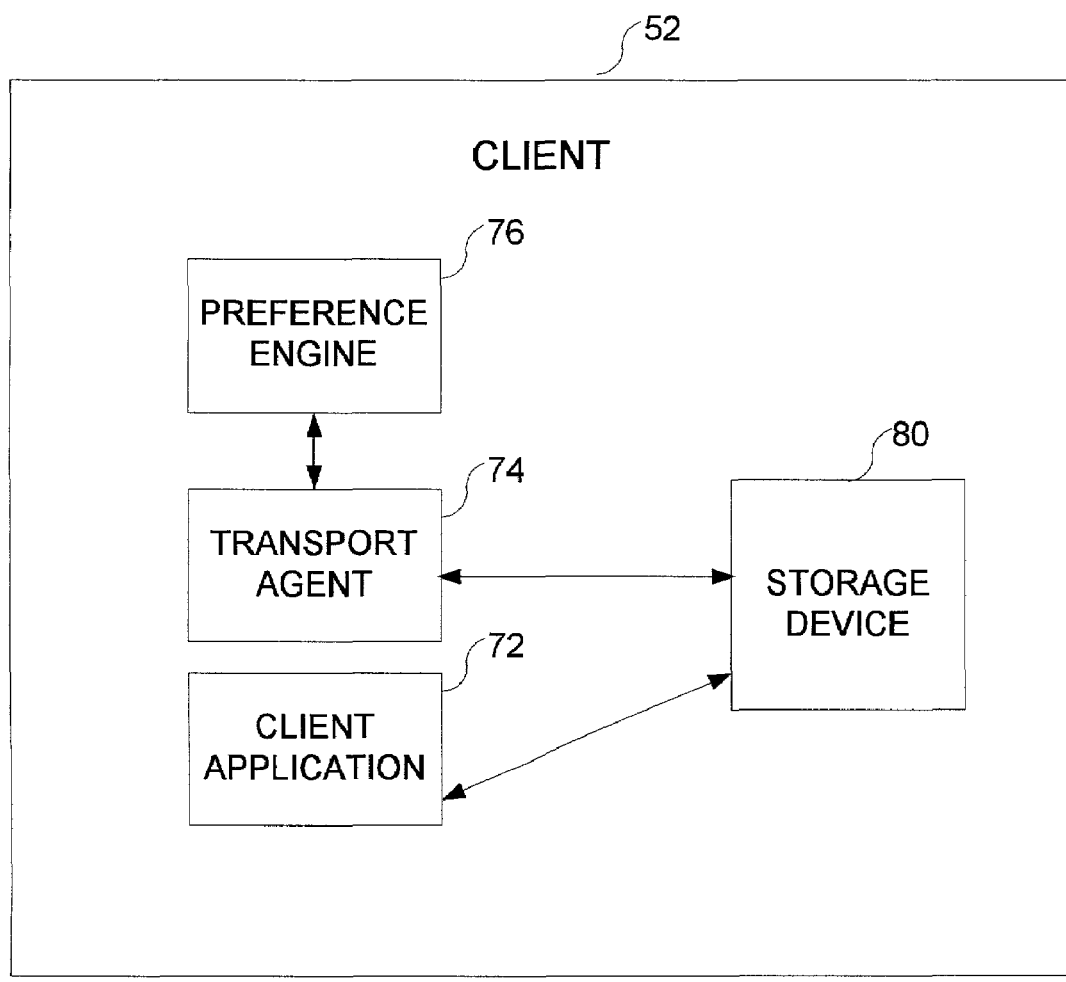
FIG. 2 is a block diagram of several components of the client computer shown in FIG. 1.

FIG. 2 is a block diagram illustrating major components of client computer 52. It will be appreciated that client computer 52 can be any one of a various computers, for example a personal computer (PC). The client computer 52 includes an operating system. For example, if the client computer is a Personal Computer (PC), the operating system may be Windows® 9x™, Windows® 2000™, Windows NT® or Windows ME®.

The client computer 52 includes application programs. For example, the embodiment shown in FIG. 2 includes a client application 72, a transport agent 74 and a preference engine 76. In the exemplary embodiment shown in FIG. 2, transport agent 74 connects to server computer 50. Upon connection to the server computer 50, the transport agent 74 requests a list of available data from the server 50. In exemplary embodiments, the data may be display content, (e.g., advertisements, entertainment, etc.) as well as a variety of other types of data, for example, executable programs, documents, bitmaps, etc. When the transport agent 74 receives the list of available data, the list of available data is forwarded to the preference engine 76. The preference engine 76 determines what data, if any, should be transmitted to the client computer 52. The preference engine 76 forwards the list of desired data to the transport agent 74. The transport agent 74 requests the desired data from the server 50. In exemplary embodiments, if more than one piece of data is desired, the transport agent 74 requests the data one piece of data at a time. When one piece of data is received, the transport agent 74 requests another piece of data. In exemplary embodiments, the content is transmitted in small chunks (e.g. one Kilobyte). The transmission may occur over several sessions. A record is kept so that a transmission begins where the prior transmission left off. Transmission only occurs when the load of the client computer 52 is sufficiently low such that the transmission will not affect the client computer's 52 processing (e.g., transmissions occur at idle times). In exemplary embodiments, the data is stored in a working directory until the transmission is complete.

When a data transmission is complete (i.e., an entire piece of data has been received), the transport agent 74 stores the received data in a storage device 80, for example in a directory designated as an inbox. For example, after a complete piece of data has been received, the transport agent 74 moves the data from the working directory to the inbox. In exemplary embodiments, each complete piece of data is stored in its own subdirectory in the inbox. The client computer 52 includes the storage device 80 for storing local data, such as the data (and key file) received from the server 50. In one embodiment, the storage device 80 is a mass storage device, such as is manufactured by Western Digital Corporation of Lake Forest, Calif.

The client application 72 retrieves the data from the storage device 80. In exemplary embodiments, a key file is packaged with the data. The client application 72 determines the appropriate operation to be performed on the data based on the information in the key file. In exemplary embodiments, the client application 72 checks the inbox at periodic intervals for new received data.

It will be appreciated that the client computer 52 also includes various other components typically included in a computing device, such as a display for displaying received data and one or more input devices, for example a keyboard and a pointing device, such as a mouse.

Figure 3:
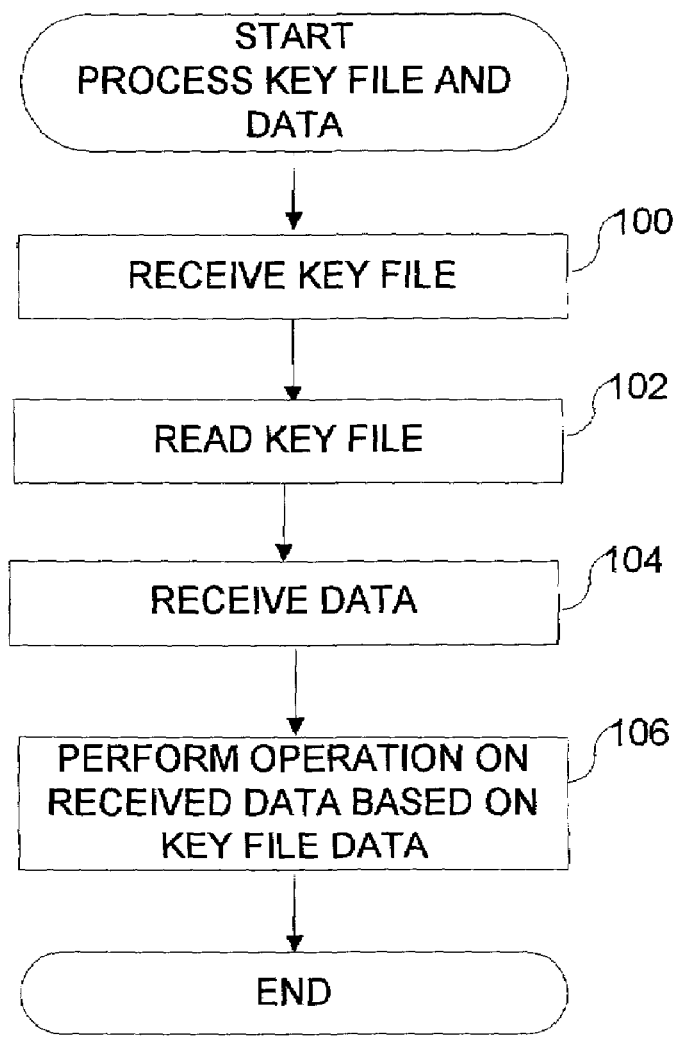
FIG. 3 is a flow diagram illustrating exemplary logic performed by a client computer for receiving data and a key file at a client computer and performing an operation on the data based on information in the key file.

FIG. 3 is a flow diagram illustrating exemplary logic performed by a client application 72 for receiving data and a key file and performing an operation on the received data based on the key file. In exemplary embodiments, the client application may receive data that does not have an associated key file. For example, the client application may receive an information package that contains content for display. In such a case, the data may be accompanied by a metafile containing targeting information instead of a key file. In exemplary embodiments, a pre-defined name, for example, "keyfile.txt" or "showmetadata.txt" identifies whether the file is a key file or a metadata file. The logic of FIG. 3 moves from a start block to block 100 where a key file is received by the client application 72. Preferably, data in the key file is encrypted. The encryption can use any existing encryption algorithm or an encryption algorithm that may be developed in the future. The client application reads the key file (decrypting the data if the data is in an encrypted format). See block 102. The key file provides information indicating an operation to be performed on data received by a client operation. The client application receives the data associated with the key file. See block 104. In exemplary embodiments, the client application 72 checks an inbox at periodic intervals to determine if new data has been received at the client computer 52 and is ready for processing (e.g., to have an appropriate operation performed on the data).

The logic proceeds to block 106 where the client application 72 performs an operation on the received data based on the information in the key file. Various examples of data that can be received and have operations performed on them based on data in a key file are shown in FIG. 4 and described below. After the appropriate operation has been performed on the data, the logic of FIG. 3 ends. The logic shown in FIG. 3 illustrates processing for data associated with a single key file. It will be appreciated that the data associated with a key file may be multiple files. For example, an executable file may also have associated data files, resources files, bitmaps, dynamic link libraries, text files (e.g., help files), etc. For any type of data, the operation performed may include moving the data to a new location. The appropriate location may be known by the application program or may be included in the key file. Additional processing may also be performed based on the information in the key file as discussed in further detail below.

Figure 5:
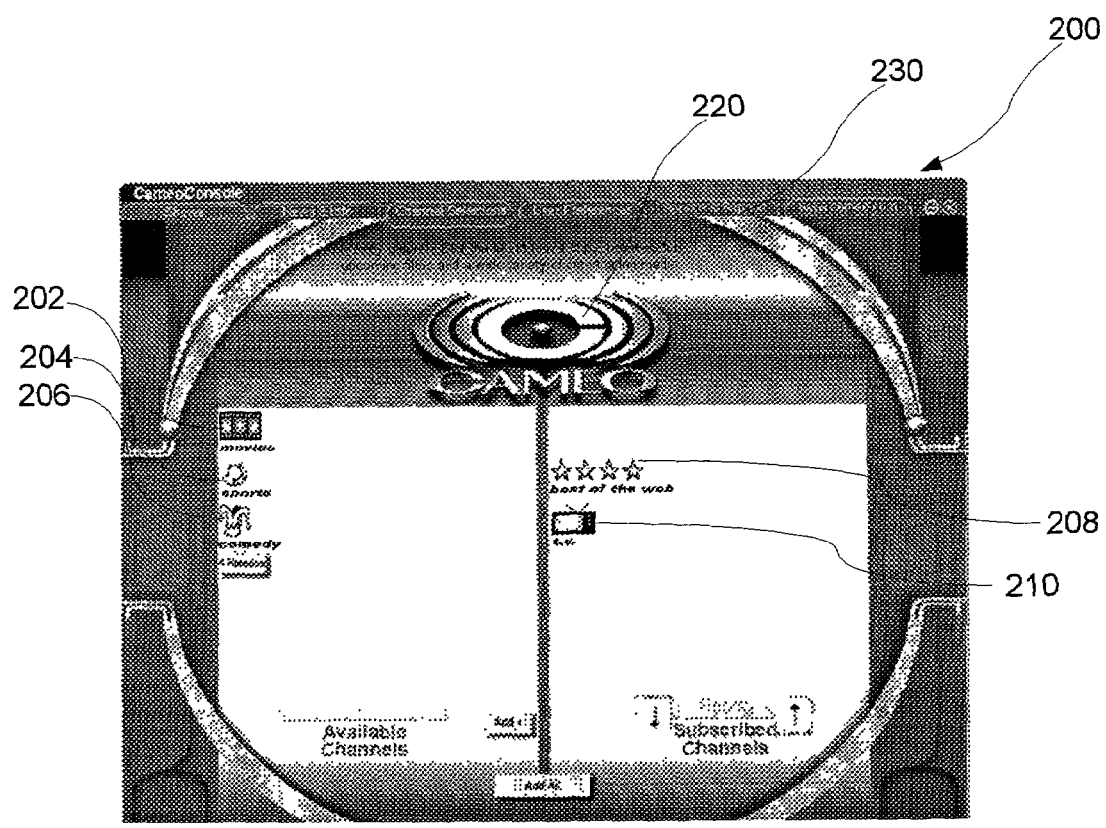
FIG. 5 is an exemplary screen shot showing a console window for displaying content.

FIG. 4 is a table enumerating exemplary types or formats of data that may be received by the client application and have an operation performed on the data based on the key file. In exemplary embodiments, the data may be associated with a specific application. For example, in the illustrated embodiment, a console application as shown in FIG. 5 is used to display content at the client computer 52. The data received may be specific to a particular application. For example, channel bitmaps, console bitmaps and support data may be received for the console display application shown in FIG. 5 as discussed in further detail below. The client application also performs operations on data that is not associated with the specific application. For example, the client application may receive and perform appropriate operations on executable files, document files and upgrade files. It will be appreciated that the data types shown and described are exemplary. A client application 52 formed in accordance with the present invention can be expanded to perform operations on other types of data not described herein.

If the information in the key file indicates that the data is a channel bitmap, the data will be stored in the appropriate location so that when data for the corresponding channel is displayed, the bitmap is displayed. For example, as shown in FIG. 5, a content display program may display content based on targeted information in a console window 200. The information displayed in the console window 200 may include channel preferences for the user. For example, the channels may include a movie channel, a television channel, a best of the web channel, a sports channel, a music channel, a comedy channel and a gaming channel. The console may include logos (e.g., bitmaps) indicating channels. In the example shown in FIG. 5, there are several channels displayed. Each of the displayed channels has an associated bitmap, namely, a movies channel bitmap 202, a sports channel bitmap 204, a comedy channel bitmap 206, a best of the web channel bitmap 208 and a television channel bitmap 210.

If the key file indicates that the data is a console bitmap, the data will be displayed in an appropriate location so that the bitmap will be displayed with the appropriate console component. For example, as discussed above, a console window 200 may be used to display content. The console may have logos, for example with a console name or a corporation name. For example, the console window 200 shown in FIG. 5 includes a console bitmap 220 with a logo for the console window 200.

If the key file indicates that the data is a support file, the data will be displayed in the appropriate location. The location may vary and may be a parameter in the key file. For example, a content display console may include various tabs for the display of information. One of the tabs may display support information. The support information will be displayed when the content console is displayed and the appropriate (e.g., support) tab is selected. For example, in the example shown in FIG. 5, there is a Service and Support tab 230 that displays support (e.g., help) information when selected. The received support data will be displayed when the Service and Support tab 230 is selected.

If the key file indicates that the data is an executable file, the executable program is run. The program may be run immediately on receipt at the client computer or at a later time. For example, the key file may include an indication that the executable should be in the startup folder so that the program is run the next time that the client computer starts up. The client application may immediately remove the file from the startup folder once the program has run, or it may leave it in the startup folder so that the program is run each time the client computer starts up until the program is removed from the client computer's startup folder, for example by the client application deleting the program or by the user removing the program from the startup folder. If the program is placed in the client computer's startup folder, there may be text in the key file that should be displayed immediately notifying the user that the executable will run when the computer is restarted.

If the key file indicates that the data is an upgrade, the appropriate existing file is replaced with the upgrade file. If appropriate, a setup program is executed.

If the file is a document file, the file is stored. The document file may be stored in a location based on the name of the document file or based on a location specified in the key file.

What is claimed is:

1. A method of receiving a transmission of data at a client computer and performing an operation on the data received at the client computer, the method comprising:
   a. receiving a key file at the client computer, the key file comprising a rule identifying the operation to be performed on the data received at the client computer;
   b. receiving the data at the client computer when a processing load of the client computer is sufficiently low that the transmission will not affect the client computer's processing; and
   c. performing the operation identified by the rule in the key file on the data received at the client computer, wherein;
   the data is an executable file;
   the operation comprises storing the executable file in a startup folder of the client computer; and
   any files in a startup folder of a respective one client computer of the at least one client computer are run when the respective client computer starts up.

2. The method of claim 1, wherein running the executable file occurs a plurality of times upon subsequent boot-ups of the client computer.

3. The method of claim 1, further comprising displaying a message at the client computer on receipt of the executable file.

4. A method of transmitting data to at least one client computer, the method comprising:
   a. providing data to be transmitted to the at least one client computer;
   b. generating a key file comprising a rule identifying an operation to be performed on the data;
   c. transmitting the key file to the at least one client computer; and
   d. transmitting the data to the at least one client computer when a processing load of the client computer is sufficiently low that the transmitting will not affect the client computer's processing, wherein:
   the data is an executable file;
   the operation comprises storing the executable file in a startup folder of the at least one client computer; and
   any files in a startup folder of a respective one client computer of the at least one client computer are run when the respective client computer starts up.

* * * * *